US012681667B2

(12) United States Patent (10) Patent No.: US 12,681,667 B2
Pan et al. (45) Date of Patent: Jul. 14, 2026

(54) MANAGING RETENTION LATENCY FOR MEMORY DEVICES OF VEHICLE SYSTEMS

(71) Applicant: Micron Technology, Inc., Boise, ID (US)

(72) Inventors: Lei Pan, Shanghai (CN); Minjian Wu, Shanghai (CN)

(73) Assignee: MICRON TECHNOLOGY, INC., Boise, ID (US)

( * ) Notice: Subject to any disclaimer, the term of this patent is extended or adjusted under 35 U.S.C. 154(b) by 0 days.

(21) Appl. No.: 18/405,379

(22) Filed: Jan. 5, 2024

(65) Prior Publication Data

US 2024/0231695 A1 Jul. 11, 2024

Related U.S. Application Data

(60) Provisional application No. 63/479,449, filed on Jan. 11, 2023.

(51) Int. Cl.
G06F 3/06 (2006.01)

(52) U.S. Cl.
CPC .......... G06F 3/0659 (2013.01); G06F 3/0611 (2013.01); *G06F 3/0679* (2013.01); *G06F 2212/7202* (2013.01)

(58) Field of Classification Search
CPC .... G06F 3/0659; G06F 3/0611; G06F 3/0679; G06F 2212/7207
See application file for complete search history.

(56) References Cited

U.S. PATENT DOCUMENTS

| | | | | |
|---|---|---|---|---|
| 11,144,225 B2 * | 10/2021 | Oh | ....................... | G06F 12/0246 |
| 2015/0332780 A1 * | 11/2015 | Jang | ................... | G11C 16/0483 |
| | | | | 365/185.18 |
| 2017/0168951 A1 * | 6/2017 | Kanno | .................... | G06F 3/061 |
| 2019/0377512 A1 * | 12/2019 | Hodes | ................... | G06F 3/0679 |
| 2021/0304009 A1 * | 9/2021 | Bazarsky | ................. | G06N 3/06 |

* cited by examiner

*Primary Examiner* — Kalpit Parikh
(74) *Attorney, Agent, or Firm* — NICHOLSON DE VOS WEBSTER & ELLIOTT LLP

(57) ABSTRACT

Exemplary methods, apparatuses, and systems include a retention latency manager for controlling memory access operations in computing systems based on latency of a set of data bits. The retention latency manager receives a set of data bits from a host. The retention latency manager writes a time stamp. The retention latency manager writes the set of data bits to a location in memory. The retention latency manager computes a time difference between a current time and the time stamp. The retention latency manager selects a set of trim settings using the time difference. The retention latency manager reads the set of data bits from the first location in memory using the set of trim settings.

20 Claims, 4 Drawing Sheets

FIG. 1

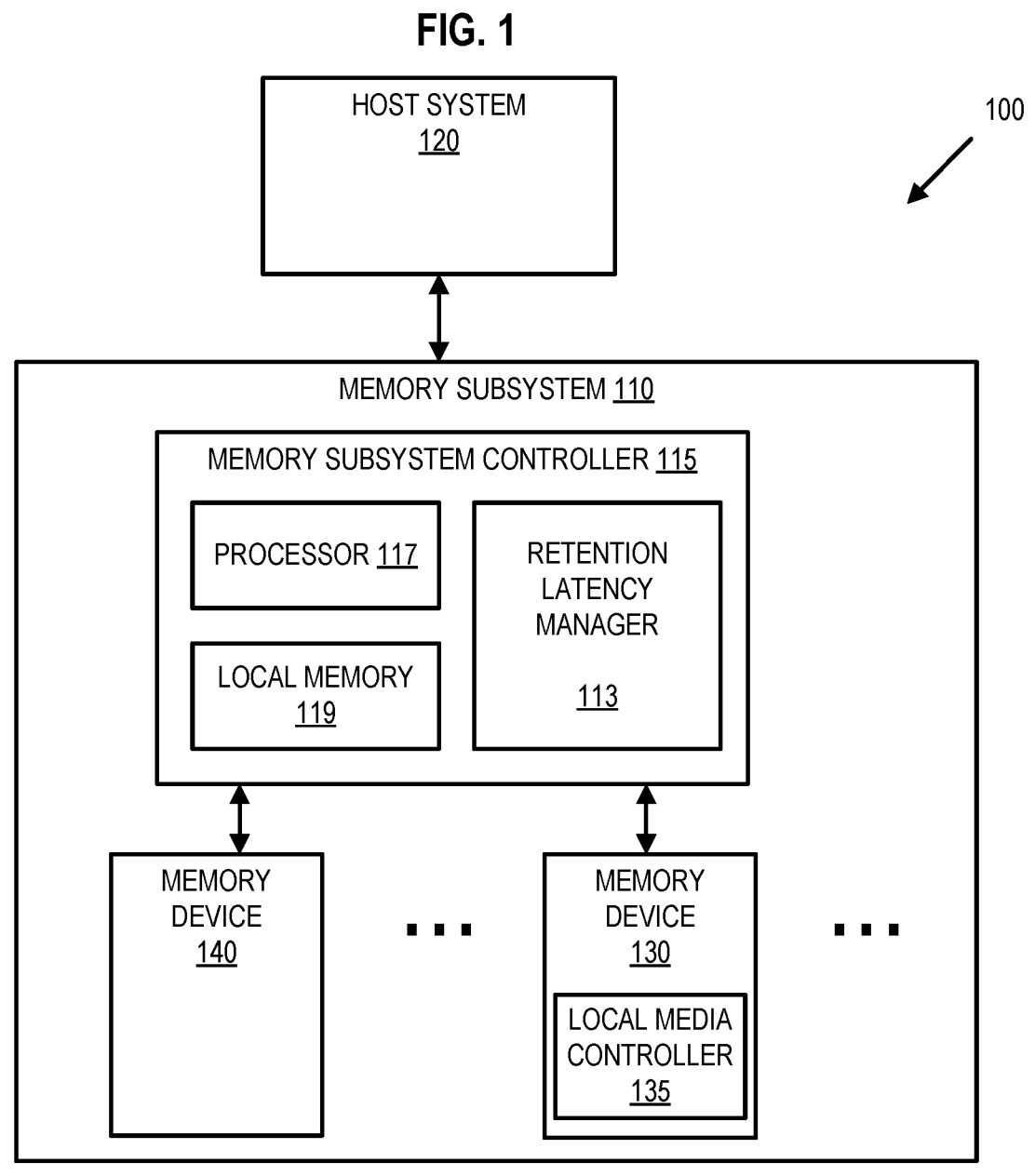

HOST SYSTEM
120

100

MEMORY SUBSYSTEM 110

MEMORY SUBSYSTEM CONTROLLER 115

PROCESSOR 117

RETENTION LATENCY MANAGER

113

LOCAL MEMORY
119

MEMORY DEVICE
140

. . .

MEMORY DEVICE
130

LOCAL MEDIA CONTROLLER
135

. . .

RECEIVE A SET OF DATA BITS FROM A HOST 305

300

WRITE A TIME STAMP 310

WRITE THE SET OF DATA BITS TO A FIRST LOCATION IN MEMORY 315

COMPUTE A TIME DIFFERENCE BETWEEN A CURRENT TIME AND THE TIME STAMP 320

SELECT A SET OF TRIM SETTINGS USING THE TIME DIFFERENCE 325

READ THE SET OF DATA BITS FROM THE FIRST LOCATION IN MEMORY USING THE SET OF TRIM SETTINGS 330

MANAGING RETENTION LATENCY FOR MEMORY DEVICES OF VEHICLE SYSTEMS

CROSS-REFERENCE TO RELATED APPLICATION

The present application claims the benefit of U.S. Provisional Patent Application No. 63/479,449 filed on Jan. 11, 2023, which is incorporated by reference herein in its entirety.

TECHNICAL FIELD

The present disclosure generally relates to managing retention latency in memory subsystems, and more specifically, relates to managing retention latency of vehicle systems.

BACKGROUND ART

A memory subsystem can include one or more memory devices that store data. The memory devices can be, for example, non-volatile memory devices and volatile memory devices. In general, a host system can utilize a memory subsystem to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 1 illustrates an example computing system that includes a memory subsystem in accordance with some embodiments of the present disclosure.

DETAILED DESCRIPTION

Figure 2:
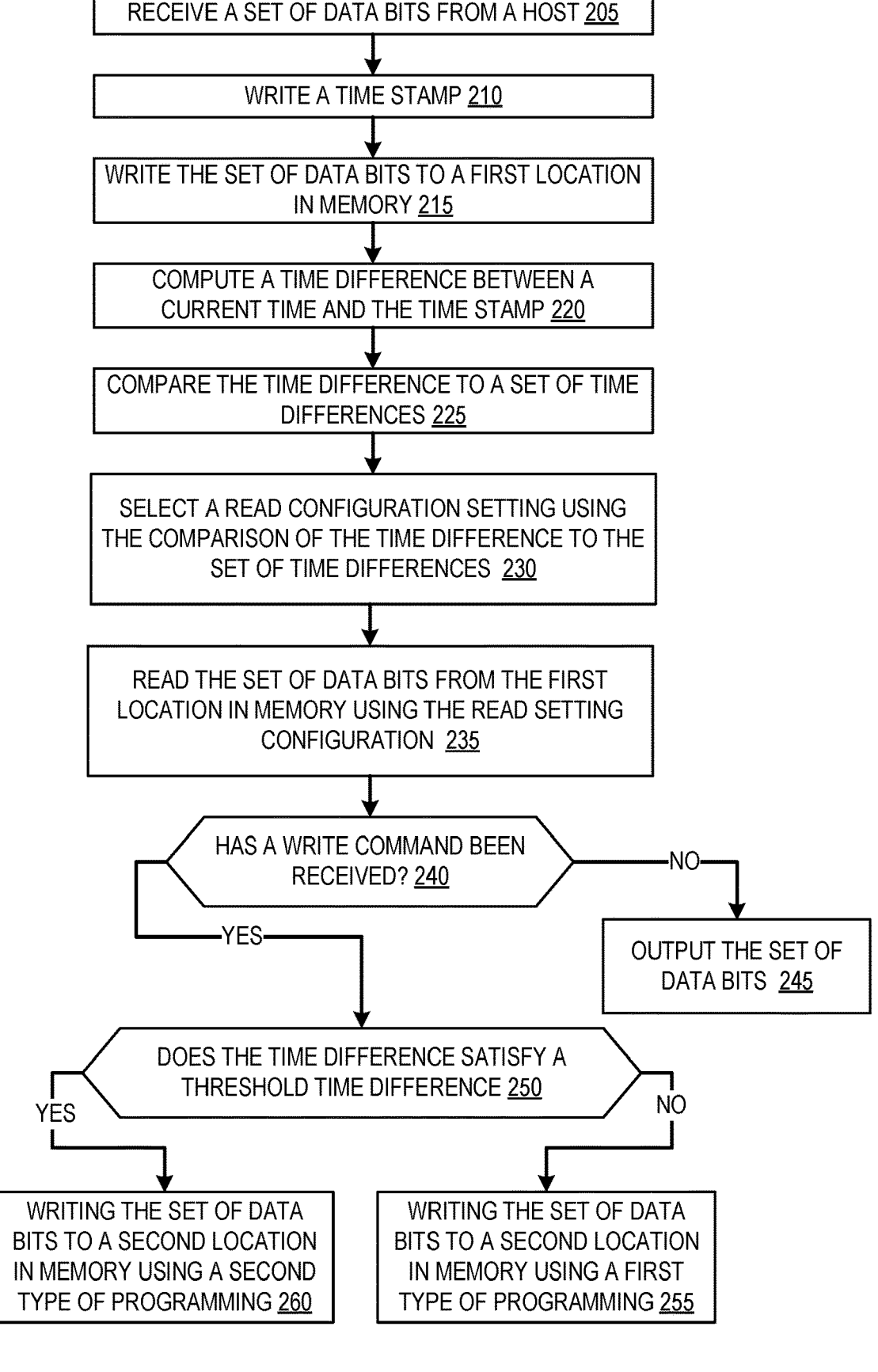
FIG. 2 is a flow diagram of an example method of dynamically selecting a type of programming based on a retention latency in accordance with some embodiments of the present disclosure.

Aspects of the present disclosure are directed to managing initialization of components of vehicle systems. A memory subsystem can be a storage device, a memory module, or a hybrid of a storage device and memory module. Examples of storage devices and memory modules are described below in conjunction with FIG. 1. In general, a host system can utilize a memory subsystem that includes one or more components, such as memory devices that store data. The host system can provide data to be stored at the memory subsystem and can request data to be retrieved from the memory subsystem.

A memory device can be a non-volatile memory device. A non-volatile memory device is a package of one or more dice. One example of non-volatile memory devices is a negative-and (NAND) memory device. Other examples of non-volatile memory devices are described below in conjunction with FIG. 1. The dice in the packages can be assigned to one or more channels for communicating with a memory subsystem controller. Each die can consist of one or more planes. Planes can be grouped into logic units (LUN). For some types of non-volatile memory devices (e.g., NAND memory devices), each plane consists of a set of physical blocks, which are groups of memory cells to store data. A cell is an electronic circuit that stores information.

Depending on the cell type, a cell can store one or more bits of binary information, and has various logic states that correlate to the number of bits being stored. The logic states can be represented by binary values, such as "0" and "1", or combinations of such values. There are various types of cells, such as single-level cells (SLCs), multi-level cells (MLCs), triple-level cells (TLCs), and quad-level cells (QLCs). For example, an SLC can store one bit of information and has two logic states.

Operating environments for automotive technology systems have multiple different retention latencies as the applications have different storage and data use profiles. The different latencies and changing external environments can negatively affect data reliability. For example, some data is stored for long periods of time and the memory can experience electrical discharging, e.g., influenced by external environments. In typical systems, to perform a read of the data, multiple different read operations using different trim settings are attempted, which decreases performance and increases the risk to data reliability. As a result, the performance of vehicle systems may degrade and data loss can occur, causing system errors and/or system failures due to a failure of data reliability.

Aspects of the present disclosure address the above and other deficiencies by receiving a request to write data to a memory location and writing a time stamp that represents an original write time of the data to a location in memory. Before performing a read of the data, the time stamp is compared to a current time to determine the data retention latency. The determined latency is mapped to a set of trim settings, which is used to read the data. Additionally, if the data is moved from a first memory location to a second memory location, the time stamp is mapped to a type of programming, which is selected to write the data using a set of trim settings optimized for the latency of the data. During the programming, an updated timestamp is written and is used for determining the latency of subsequent read operations.

FIG. 1 illustrates an example computing system 100 that includes a memory subsystem 110 in accordance with some embodiments of the present disclosure. The memory subsystem 110 can include media, such as one or more volatile memory devices (e.g., memory device 140), one or more non-volatile memory devices (e.g., memory device 130), or a combination of such.

A memory subsystem 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory subsystems 110. In some embodiments, the host system 120 is coupled to different types of memory subsystems 110. FIG. 1 illustrates one example of a host system 120 coupled to one memory subsystem 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory subsystem 110, for example, to write data to the memory subsystem 110 and read data from the memory subsystem 110.

The host system 120 can be coupled to the memory subsystem 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory subsystem 110. The host system 120 can further utilize an NVM Express (NVMe) interface to access components (e.g., memory devices 130) when the memory subsystem 110 is coupled with the host system 120 by the PCIe interface. The physical host interface can provide an interface for passing control, address, data, and other signals between the memory subsystem 110 and the host system 120. FIG. 1 illustrates a memory subsystem 110 as an example. In general, the host system 120 can access multiple memory subsystems via a same communication connection, multiple separate communication connections, and/or a combination of communication connections.

The memory devices 130,140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Although non-volatile memory devices such as NAND type memory (e.g., 2D NAND, 3D NAND) and 3D cross-point array of non-volatile memory cells are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

A memory subsystem controller 115 (or controller 115 for simplicity) can communicate with the memory devices 130 to perform operations such as reading data, writing data, or erasing data at the memory devices 130 and other such operations (e.g., in response to commands scheduled on a command bus by controller 115). The memory subsystem controller 115 can include hardware such as one or more integrated circuits and/or discrete components, a buffer memory, or a combination thereof. The hardware can include digital circuitry with dedicated (i.e., hard-coded) logic to perform the operations described herein. The memory subsystem controller 115 can be a microcontroller, special purpose logic circuitry (e.g., a field programmable gate array (FPGA), an application specific integrated circuit (ASIC), etc.), or another suitable processor.

The memory subsystem controller 115 can include a processing device 117 (processor) configured to execute instructions stored in a local memory 119. In the illustrated example, the local memory 119 of the memory subsystem controller 115 includes an embedded memory configured to store instructions for performing various processes, operations, logic flows, and routines that control operation of the memory subsystem 110, including handling communications between the memory subsystem 110 and the host system 120.

In some embodiments, the local memory 119 can include memory registers storing memory pointers, fetched data, etc. The local memory 119 can also include read-only memory (ROM) for storing micro-code. While the example memory subsystem 110 in FIG. 1 has been illustrated as including the memory subsystem controller 115, in another embodiment of the present disclosure, a memory subsystem 110 does not include a memory subsystem controller 115, and can instead rely upon external control (e.g., provided by an external host, or by a processor or controller separate from the memory subsystem 110).

In general, the memory subsystem controller 115 can receive commands or operations from the host system 120 and can convert the commands or operations into instructions or appropriate commands to achieve the desired access to the memory devices 130 and/or the memory device 140. The memory subsystem controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130.

The memory subsystem controller 115 can further include host interface circuitry to communicate with the host system 120 via the physical host interface. The host interface circuitry can convert the commands received from the host system into command instructions to access the memory devices 130 and/or the memory device 140 as well as convert responses associated with the memory devices 130 and/or the memory device 140 into information for the host system 120.

The memory subsystem 110 can also include additional circuitry or components that are not illustrated. In some embodiments, the memory subsystem 110 can include a cache or buffer (e.g., DRAM) and address circuitry (e.g., a row decoder and a column decoder) that can receive an address from the memory subsystem controller 115 and decode the address to access the memory devices 130.

In some embodiments, the memory devices 130 include local media controllers 135 that operate in conjunction with memory subsystem controller 115 to execute operations on one or more memory cells of the memory devices 130. An external controller (e.g., memory subsystem controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory subsystem 110 includes a retention latency manager 113 that receives a set of data from a host and monitors time intervals between requests to access the set of data. In some embodiments, the controller 115 includes at least a portion of the retention latency manager 113. For example, the controller 115 can include a processor 117 (processing device) configured to execute instructions stored in local memory 119 for performing the operations described herein. In some embodiments, the retention latency manager 113 is part of the host system 120, an application, or an operating system.

The retention latency manager 113 can identify a latency of a set of data received from the host system 120. The latency of the set of data is a delay between reads or transfers of the set of data. In an example, the retention latency manager 113 receives the set of data from the host system 120 and stores a time stamp representing the system time at which the set of data bits was received or the system time at which the set of data bits was first written to one of memory devices 130. Examples of the time stamp include a system time that corresponds to start time or end time for a receive operation or a write operation. The retention latency manager 113 writes the time stamp to a reserved location in the memory subsystem such as a location designated for storing time stamps that are associated with different sets of data. In some embodiments, the time stamp corresponding to an original receive or write command is written such that the time stamp is read-only and cannot be modified. By writing the time stamp as read-only, the host system 120 can verify the data security of the set of data and also determine a disposition time for sets of data that have exceeded a retention policy for removal (e.g., erase or mark as invalid data).

Additionally, the retention latency manager 113 can determine that the set of data is to be relocated to another location in the memory devices 130. For example, the retention latency manager identifies a second location in memory for a memory access command for the set of data (e.g., a write of the set of data to the second location in response to a data integrity scan, host update of the data, etc.). After identifying the second location in memory, the retention latency manager 113 compares a time difference between a current system time with the system time represented by the time stamp. The time difference is compared to a threshold time difference to determine, e.g., if the set of data is long retention latency or short retention latency. For instance, if the time difference does not satisfy the threshold time difference, the retention latency manager 113 classifies the set of data as short retention latency. In contrast, if the time difference satisfies the threshold time difference, the retention latency manager 113 classifies the set of data as long retention latency. Using the retention latency, the retention latency manager 113 selects a type of programming. Additional details on the types of programming are discussed below. Further details with regard to the operations of the retention latency manager 113 are described below.

FIG. 2 is a flow diagram of an example method of dynamically selecting a type of programming based on a retention latency in accordance with some embodiments of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by the retention latency manager 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 205, the retention latency manager 113 receives a set of data bits from a host. In some embodiments, the retention latency manager 113 is configured to receive multiple sets of data bits from a host system for programming to the memory devices 130. For example, the retention latency manager 113 can receive a data stream from the host system 120, the data stream including multiple sets of data bits (e.g., wordlines, pages, blocks, etc.). In some embodiments, the retention latency manager 113 receives at least one block of data for writing to memory. Examples set forth herein refer to blocks, but other subdivisions of memory and other sets/groupings of data can be used.

At operation 210, the retention latency manager 113 writes a time stamp. In some embodiments, the retention latency manager 113 identifies a current system time that corresponds to start time or end time for a receive operation of the set of data bits. The retention latency manager 113 writes the time stamp that represents the current system time in a reserved location in the memory subsystem such as file system metadata assigned to the set of data bits. In other embodiments, the retention latency manager 113 writes the time stamp representing the current system time at the start or completion of writing the set of bits to memory, such as is performed at operation 215.

In some embodiments, the time stamp is written as read-only and cannot be modified. By writing the time stamp as read-only, the host system 120 can verify the data security of the set of data and also determine a disposition time for sets of data that have exceeded a retention policy for removal (e.g., erase or mark as invalid data).

At operation 215, the retention latency manager 113 writes the set of data bits to a first location in memory. In some embodiments the retention latency manager 113 selects at least one block of the memory devices 130 for writing the set of data bits. The retention latency manager 113 can write the set of data bits using a default set of trim settings or can use a set of trim settings that correspond to an average latency profile of the host system 120, an application, a stream, etc. For example, the retention latency manager can write the set of data bits using different threshold voltages ($V_t$) and write pulses depending on the latency profile of the host system. In some embodiments, the retention latency manager 113 can additionally write a first time stamp that corresponds to a programming time of a first cell in a block and a second time stamp that corresponds to a programming time of a last cell in the block. While operation 215 is described in terms of blocks, the time stamp could be configured to accommodate different granularities of memory, such as writes executed at the page level. In the page level configuration, the first time stamp corresponds to a programming time of a first cell of a page and the second time stamp corresponds to a programming time of a last cell of the page.

At operation 220, the retention latency manager 113 computes a time difference between the time stamp and a current system time. For example, the retention latency manager 113 computes the time difference in response to an operation on the data written to the first location in memory that includes reading the data. In some embodiments, the retention latency calculates a time difference by subtracting the time stamp from the current system time. The time difference can be compared in any format, such as YYYY-MM-DD and HH:MM:SS or as a binary representation of the time stamp and current system time.

At operation 225, the retention latency manager compares the time difference to a set of one or more threshold time differences. In some embodiments, the retention latency manager compares the time difference to a lookup table or other data structure that includes a mapping that relates time differences to different latencies. Each threshold time difference, or range of time differences, corresponds to a different read setting configuration depending on the latency of previously written data. For example, a first time interval has a read configuration setting including a first error correction method, first read pulse characteristics (e.g., trim settings such as voltage values and pulse duration), and/or other settings. A second time interval has a different read configuration setting including a second error correction method, second read pulse characteristics, and/or other settings. Each of the read configuration settings is optimized for the time interval to which it corresponds such as a shorter time interval has a first read configuration setting that maximizes performance while a longer time interval has a second read configuration setting that maximizes error correction with slower performance. In some embodiments, the lookup table stores relationships between the read setting configuration, a number of program/erase cycles, data locations, and data retention latency. The retention latency manager 113 selects the read setting configuration from the lookup table using the time difference and, optionally, one or more of the number of program/erase cycles and data location.

At operation 230, the retention latency manager 113 selects a read configuration setting using the comparison of the time difference and the set of time differences. As described above at operation 225, the retention latency manager 113 identifies a time interval and corresponding read configuration setting for the time difference computed at operation 220. The read configuration setting is selected using the time difference and the set of time differences in the look-up table that is closest to the time difference. In an example, if the time difference was 3 months and the lookup table entries included 0-2 months, 2-6 months, and 6 months or longer, the retention latency manager selects the entry corresponding to 2-6 months. As described above, each read configuration setting includes error correction settings, read pulse settings, and other settings.

At operation 235, the retention latency manager 113 reads the set of data bits from the first location in memory using the selected read setting configuration. The retention latency manager 113 sets the read configuration settings as trim settings for performing the read of the set of data bits from the first location in memory. After the read configurations are applied to the trim settings for performing read, the retention latency manager 113 reads the set of data bits.

At operation 240, the retention latency manager 113 determines if a write command has been received. For example, the retention latency manager 113 can read the set of data bits as described with reference to operation 235 as a part of an operation to move the data and/or update at least a portion of the data. In some embodiments, a write command to program the set of data bits to a second location in memory is received after the set of data bits are written to the first location in memory at operation 215. The write command can also be received asynchronously to operations 220-235. If a write command has been received, the method 200 proceeds to operation 250. If a write command has not been received, the method 200 proceeds to operation 245.

At operation 245, the retention latency manager 113 outputs the set of data bits. In some embodiments, the retention latency manager 113 returns the set of data bits to the host system 120. The retention latency manager 113 communicates a stream of information to the host system 120, with the stream of information including at least the set of data bits.

At operation 250, the retention latency manager 113 determines if the time difference satisfies a threshold time difference. The threshold time difference is configurable depending on an average or expected latency time that distinguishes between short retention latency data and long retention latency data for the memory devices 130. In some embodiments, the threshold time difference is predetermined based on the type of data received from each host system 120. In an example, for a host system 120 that stores data for long periods of time, such as a sensor data recording system, the threshold time difference is set to an average service interval (e.g., sensor data download) of the vehicle. In another example, for a host system 120 that stores data for short periods of time and has frequent data access, such as a driver assistance system, the threshold time difference is set to a time interval equal to the average time between data access requests (e.g., retrieving information for the driver). If the retention latency manager 113 determines the time difference satisfies the threshold time difference, the method 200 proceeds to operation 260. If the retention latency manager 113 determines the time difference does not satisfy the threshold time difference, the method 200 proceeds to operation 255.

In some embodiments, operation 250 includes multiple threshold time differences that can be compared to the time difference. In an example, the time difference can use a look-up table or another data structure similar to the look-up table described at operation 230 for programming type configuration. If the time difference is 1.5 months and the lookup table entries included 0-2 months, 2-6 months, and 6 months or longer, the retention latency manager selects the entry corresponding to 0-2 months. Programming types includes write pulse characteristics, write pulse amplitude, and other settings. A first programming type can be optimized for short retention latency while a second programming type can be optimized for long retention latency.

At operation 255, the retention latency manager 113 writes the set of data bits to the second location in memory using a first type of programming. In some embodiments, the first type of programming uses a first set of trim settings that are intended for short retention latency by modifying a voltage distribution for the memory cells. For short retention latency, the first set of trim settings is optimized for a high performance memory access operation such as by using higher voltage levels and shorter voltage pulses relative to the second type of programming described at operation 260.

At operation 260, the retention latency manager 113 writes the set of data bits to the second location in memory using a second type of programming. In some embodiments, the second type of programming uses a second set of trim settings that are intended for long retention latency. For long retention latency, the second set of trim settings is optimized for a high reliability and lower performance memory access operation such as by using lower voltage levels and longer voltage pulses relative to the first type of programming described at operation 255.

In some embodiments, the retention latency manager 113 writes an updated time stamp as additional metadata in response to receiving a request to internally move the set of data bits such as through a garbage collection operation. In these examples, the updated time stamp can be used in connection with subsequent iterations of operations 210-225 for existing data being relocated to another location in memory. The retention latency manager 113 uses the updated time stamp for computing an additional time difference and determining an additional read configuration setting for a read operation in response to a subsequent read request. In other cases, retention latency manager 113 uses the updated time stamp for computing an additional time difference and determining an additional set of trim settings for writing to the subsequent location in memory of the set of data bits.

Figure 3:
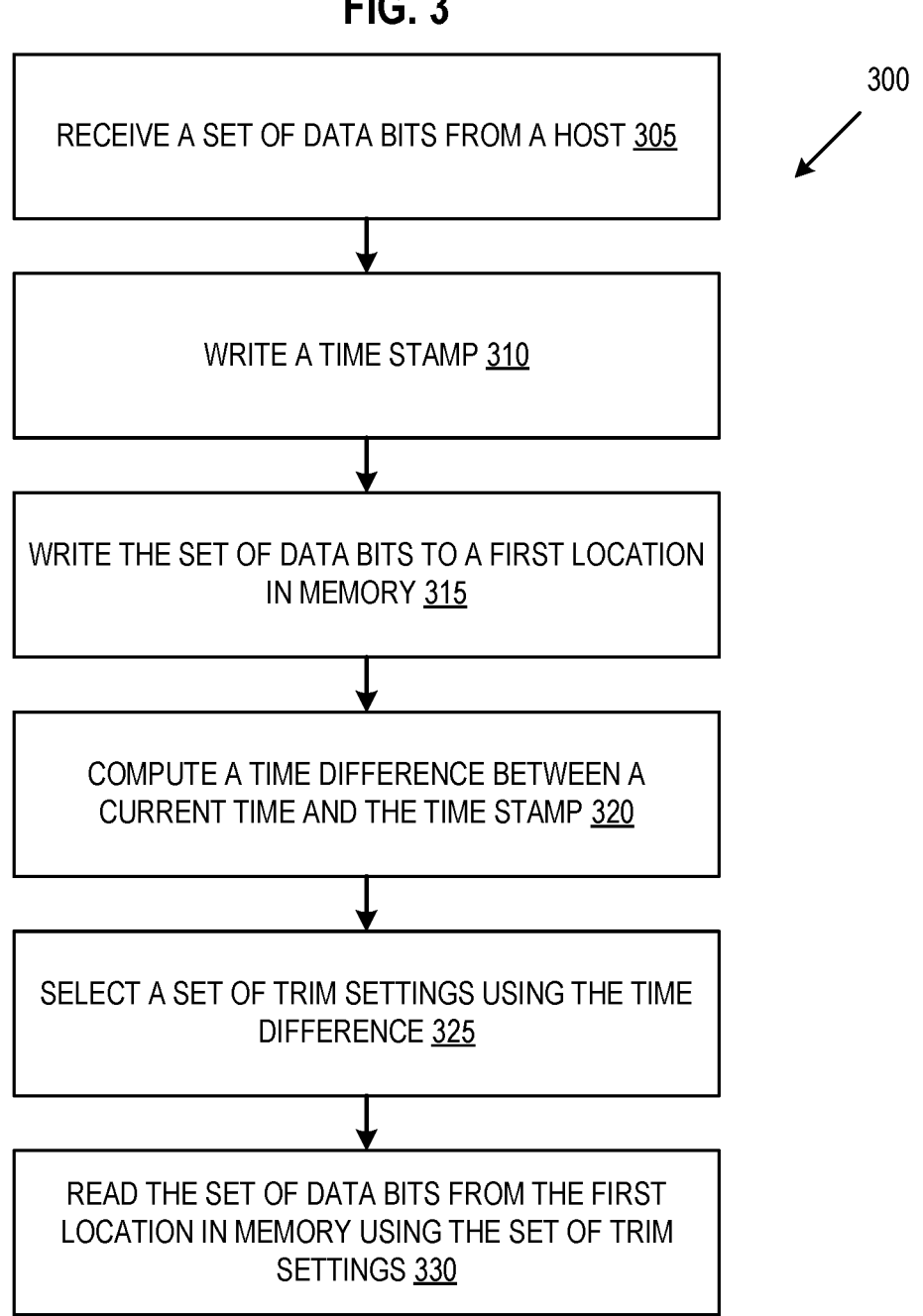
FIG. 3 is a flow diagram of an example method of managing retention latency in accordance with some embodiments of the present disclosure.

FIG. 3 is a flow diagram of an example method to manage the data retention latency in accordance with some embodiments of the present disclosure. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by the retention latency manager 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 305, receives a set of data bits from a host. As described above at operation 205, the retention latency manager 113 is communicatively coupled to a network interface device that receives communication from the host system.

At operation 310, the retention latency manager 113 writes a time stamp. As described above at operation 210, the retention latency manager 113 writes a time stamp that represents a current system time to a reserved location in memory for storing time stamp data. In some embodiments, the time stamp is included in metadata for each block or page depending on the subdivision units of memory being used.

At operation 315, the retention latency manager 113 writes the set of data bits to a first location in memory. As described above at operation 215, the retention latency manager 113 writes the set of data to one or more blocks in the memory device.

At operation 320, the retention latency manager 113 computes a time difference between a current time and the time stamp. As described above at operation 220, the retention latency manager 113 can determine an elapsed time between the current system time and a previous time represented by the time stamp.

At operation 325, the retention latency manager 113 selects a set of trim settings using the time difference. As described above at operation 225-230, the retention latency manager 113 selects configurations for performing a read operation of the set of data bits.

At operation 330, the retention latency manager 113 reads the set of data bits from the first location in memory using the trim settings. As described above at operation 235, the retention latency manager applies the trim settings and performs a read operation of the first location in memory to return the set of data bits.

Figure 4:
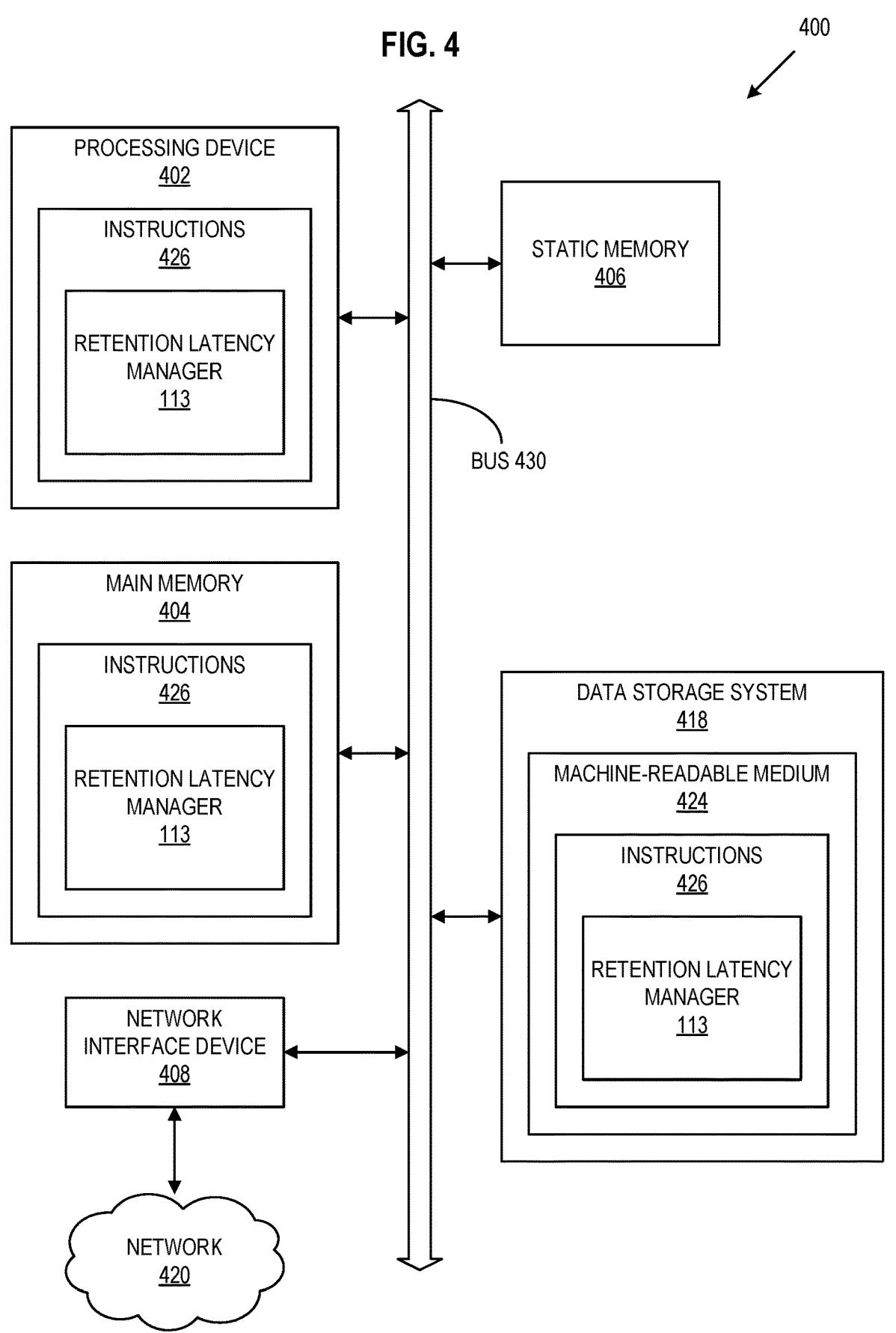
FIG. 4 is a block diagram of an example computer system in which embodiments of the present disclosure may operate.

FIG. 4 illustrates an example machine of a computer system 400 within which a set of instructions, for causing the machine to perform any one or more of the methodologies discussed herein, can be executed. In some embodiments, the computer system 400 can correspond to a host system (e.g., the host system 120 of FIG. 1) that includes, is coupled to, or utilizes a memory subsystem (e.g., the memory subsystem 110 of FIG. 1) or can be used to perform the operations of a controller (e.g., to execute an operating system to perform operations corresponding to retention latency manager 113 of FIG. 1). In alternative embodiments, the machine can be connected (e.g., networked) to other machines in a LAN, an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 400 includes a processing device 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a data storage system 418, which communicate with each other via a bus 430.

Processing device 402 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 402 can also be one or more special-purpose processing devices such as an application specific integrated circuit (ASIC), a field programmable gate array (FPGA), a digital signal processor (DSP), network processor, or the like. The processing device 402 is configured to execute instructions 426 for performing the operations and steps discussed herein. The computer system 400 can further include a network interface device 408 to communicate over the network 420.

The data storage system 418 can include a machine-readable storage medium 424 (also known as a computer-readable medium) on which is stored one or more sets of instructions 426 or software embodying any one or more of the methodologies or functions described herein. The instructions 426 can also reside, completely or at least partially, within the main memory 404 and/or within the processing device 402 during execution thereof by the computer system 400, the main memory 404 and the processing device 402 also constituting machine-readable storage media. The machine-readable storage medium 424, data storage system 418, and/or main memory 404 can correspond to the memory subsystem 110 of FIG. 1.

In one embodiment, the instructions 426 include instructions to implement functionality corresponding to an intelligent boot manager (e.g., the retention latency manager 113 of FIG. 1). While the machine-readable storage medium 424 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. For example, a computer system or other data processing system, such as the controller 115, may carry out the computer-implemented methods 200 and 300 in response to its processor executing a computer program (e.g., a sequence of instructions) contained in a memory or other non-transitory machine-readable storage medium. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
receiving a set of data bits from a host;
writing an original time stamp for the set of data bits;
writing the set of data bits to a first location in memory;

computing a time difference between a current time and the original time stamp;

determining a time range of a plurality of time ranges using the time difference;

selecting a set of trim settings using the time range;

reading the set of data bits from the first location in memory using the set of trim settings;

writing the set of data bits to a second location in memory;

generating an updated time stamp representing a time of writing the set of data bits to the second location in memory;

computing a second time difference between the original time stamp and the current time;

determining that the second time difference satisfies a threshold time difference; and writing the set of data bits to a third location in memory using a first type of programming in response to the determination, wherein writing the set of data bits to the third location occurs after writing the set of data bits to the second location.

2. The method of claim 1, wherein writing the set of data bits to the second location in memory comprises:

determining the time difference does not satisfy a threshold time difference; and writing the set of data bits to the second location in memory using a second type of programming.

3. The method of claim 2, wherein the second type of programming comprises programming the set of data bits using a second set of write trim settings for short retention latency.

4. The method of claim 1, wherein writing the set of data bits to the second location in memory comprises:

determining the time difference satisfies a threshold time difference; and writing the set of data bits to the second location in memory using the first type of programming.

5. The method of claim 4, wherein the first type of programming comprises programming the set of data bits using a first set of write trim settings for long retention latency.

6. The method of claim 1 further comprising:

receiving a read request for the set of data bits from the second location in memory;

computing a third time difference between the updated time stamp and the current time;

determining a second time range of the plurality of time ranges using the third time difference;

selecting a second set of trim settings using the second time range; and reading the set of data bits from the second location in memory using the second set of trim settings.

7. The method of claim 1, wherein selecting the set of trim settings further uses a number of program/erase cycles.

8. A non-transitory computer-readable storage medium comprising instructions that, when executed by a processing device, cause the processing device to:

receive a set of data bits from a host;

write an original time stamp for the set of data bits;

write the set of data bits to a first location in memory;

compute a time difference between a current time and the original time stamp;

determine a time range of a plurality of time ranges using the time difference;

select a set of trim settings using the time range;

read the set of data bits from the first location in memory using the set of trim settings;

write the set of data bits to a second location in memory;

generate an updated time stamp representing a time of writing the set of data bits to the second location in memory;

compute a second time difference between the original time stamp and the current time;

determine that the second time difference satisfies a threshold time difference; and write the set of data bits to a third location in memory using a first type of programming in response to the determination, wherein writing the set of data bits to the third location occurs after writing the set of data bits to the second location.

9. The non-transitory computer-readable storage medium of claim 8, wherein writing the set of data bits to the second location in memory comprises:

determining the time difference does not satisfy a threshold time difference; and writing the set of data bits to the second location in memory using a second type of programming.

10. The non-transitory computer-readable storage medium of claim 9, wherein the second type of programming comprises programming the set of data bits using a second set of write trim settings for short retention latency.

11. The non-transitory computer-readable storage medium of claim 9, wherein writing the set of data bits to the second location in memory comprises:

determining the time difference satisfies a threshold time difference; and writing the set of data bits to the second location in memory using the first type of programming.

12. The non-transitory computer-readable storage medium of claim 11, wherein the first type of programming comprises programming the set of data bits using a first set of write trim settings for long retention latency.

13. The non-transitory computer-readable storage medium of claim 8 wherein selecting the set of trim settings further uses a number of program/erase cycles.

14. The non-transitory computer-readable storage medium of claim 9, wherein the processing device is further to:

receive a read request for the set of data bits from the second location in memory;

compute a third time difference between the updated time stamp and the current time;

determine a second time range of the plurality of time ranges using the third time difference;

select a second set of trim settings using the second time range; and read the set of data bits from the second location in memory using the second set of trim settings.

15. A system comprising:

a plurality of memory devices; and a processing device, operatively coupled with the plurality of memory devices, the processing device comprising a processor configured to execute instructions to cause the processing device to:

receive a set of data bits from a host;

write an original time stamp for the set of data bits;

write the set of data bits to a first location in memory;

compute a time difference between a current time and the original time stamp;

determine a time range of a plurality of time ranges using the time difference;

select a set of trim settings using the time range and a number of program/erase cycles;

read the set of data bits from the first location in memory using the set of trim settings;

write the set of data bits to a second location in memory;

generate an updated time stamp representing a time of writing the set of data bits to the second location in memory;

compute a second time difference between the original time stamp and the current time;

determine that the second time difference satisfies a threshold time difference; and write the set of data bits to a third location in memory using a first type of programming in response to the determination, wherein writing the set of data bits to the third location occurs after writing the set of data bits to the second location.

16. The system of claim 15, wherein writing the set of data bits to the second location in memory comprises:

determining the time difference does not satisfy a threshold time difference; and writing the set of data bits to the second location in memory using a second type of programming.

17. The system of claim 16, wherein the second type of programming comprises programming the set of data bits using a second set of write trim settings for short retention latency.

18. The system of claim 15, wherein writing the set of data bits comprises:

determining the time difference satisfies a threshold time difference; and writing the set of data bits to the second location in memory using the first type of programming.

19. The system of claim 18, wherein the first type of programming comprises programming the set of data bits using a first set of write trim settings for long retention latency.

20. The system of claim 15, wherein the processing device is further to:

receive a read request for the set of data bits from the second location in memory;

compute a third time difference between the updated time stamp and the current time;

determine a second time range of the plurality of time ranges using the third time difference;

select a second set of trim settings using the second time range; and read the set of data bits from the second location in memory using the second set of trim settings.

\* \* \* \* \*